(12) United States Patent
Collins et al.

(10) Patent No.: US 8,006,503 B2
(45) Date of Patent: Aug. 30, 2011

(54) ENERGY RECOVERY SYSTEM AND METHOD FOR A REFRIGERATED DEHUMIDIFICATION PROCESS

(75) Inventors: James C. Collins, Mooresville, NC (US); David V. Woodward, Graniteville, SC (US)

(73) Assignee: Ingersoll-Rand Company, Montvale, NJ (US)

( * ) Notice: Subject to any disclaimer, the term of this patent is extended or adjusted under 35 U.S.C. 154(b) by 342 days.

(21) Appl. No.: 11/924,279

(22) Filed: Oct. 25, 2007

(65) Prior Publication Data

US 2008/0110183 A1 May 15, 2008

Related U.S. Application Data

(60) Provisional application No. 60/865,970, filed on Nov. 15, 2006.

(51) Int. Cl.
*F25D 17/06* (2006.01)
(52) U.S. Cl. .......................................................... 62/93
(58) Field of Classification Search ............... 62/93, 506
See application file for complete search history.

(56) References Cited

U.S. PATENT DOCUMENTS

| | | | |
|---|---|---|---|
| 2,296,997 A | 9/1942 | Knoy | |
| 3,739,594 A * | 6/1973 | Freese | .............................. 62/93 |
| 4,010,624 A | 3/1977 | McFarlan | |
| 4,329,788 A | 5/1982 | Sterlini | |
| 5,113,668 A | 5/1992 | Wachs, III et al. | |
| 5,327,743 A | 7/1994 | Coltrin | |
| 5,682,757 A | 11/1997 | Peterson | |
| 5,794,453 A * | 8/1998 | Barnwell | .......................... 62/79 |
| 5,979,172 A | 11/1999 | Teller | |
| 5,983,651 A * | 11/1999 | Huang | ............................ 62/152 |
| 6,470,693 B1 * | 10/2002 | Dickey | .............................. 62/90 |
| 6,857,285 B2 | 2/2005 | Hebert | |
| 6,898,947 B2 | 5/2005 | Hebert | |
| 7,013,658 B2 | 3/2006 | Dobmeier et al. | |
| 2002/0092313 A1 | 7/2002 | Brifu | |
| 2003/0213261 A1 | 11/2003 | Hebert | |
| 2004/0055324 A1 | 3/2004 | Gupta | |
| 2004/0144118 A1 | 7/2004 | Hebert | |
| 2005/0166614 A1* | 8/2005 | Dobmeier et al. | ............... 62/150 |

FOREIGN PATENT DOCUMENTS

| | | |
|---|---|---|
| CN | 2802337 Y | 8/2006 |
| DE | 3827005 A1 | 2/1990 |
| EP | 1692556 A2 | 9/2006 |

* cited by examiner

*Primary Examiner* — Melvin Jones
(74) *Attorney, Agent, or Firm* — Michael Best & Friedrich LLP

(57) ABSTRACT

A gas compression system includes a flow of compressed gas, a separator positioned to receive the flow of compressed gas and discharge a second flow of compressed gas and a flow of condensate, and a flow of compressed refrigerant. A heat exchanger is positioned to receive the flow of condensate and the flow of compressed refrigerant. The heat exchanger is arranged such that the flow of condensate cools the flow of refrigerant.

15 Claims, 5 Drawing Sheets

ENERGY RECOVERY SYSTEM AND METHOD FOR A REFRIGERATED DEHUMIDIFICATION PROCESS

RELATED APPLICATION DATA

The present application claims the benefit of provisional patent application Ser. No. 60/865,970, filed Nov. 15, 2006, the subject matter of which is hereby fully incorporated by reference.

BACKGROUND

The invention relates to an energy recovery system and method for use with a gas compression system. More particularly, the invention relates to an energy recovery system and method for use with a gas compression system that includes a refrigerated dehumidification process.

Compressor systems often include a system that removes moisture from the compressed gas. For example, air compressor systems may employ a refrigerated air dryer system that cools the flow of compressed air to condense water out of the air. The water, if not removed can cause damage to downstream components or adversely affect the operation of the downstream components that use the air.

SUMMARY

In one embodiment, the invention provides a gas compression system that includes a compressor that is operable to produce a flow of compressed gas that includes moisture. A refrigeration system includes a condenser, an evaporator, an expansion device, and a compressor that are arranged to cool the flow of compressed gas to produce a flow of condensate. The flow of condensate passes through a recuperator such that the recuperator and the condenser cooperate to cool the refrigerant to a desired temperature.

The recuperator can be positioned upstream or downstream of the condenser but is preferably separate from the condenser. The recuperator includes two flow paths that are each preferably maintained at a pressure above atmospheric pressure.

In one construction, the invention provides a gas compression system that includes a flow of compressed gas, a separator positioned to receive the flow of compressed gas and discharge a second flow of compressed gas and a flow of condensate, and a flow of compressed refrigerant. A heat exchanger is positioned to receive the flow of condensate and the flow of compressed refrigerant. The heat exchanger is arranged such that the flow of condensate cools the flow of refrigerant.

In another construction, the invention provides a gas compression system that includes a gas compressor operable to produce a flow of compressed gas, a refrigerant compressor operable to produce a flow of compressed refrigerant, and an evaporator positioned to receive the flow of compressed refrigerant and the flow of compressed gas and arranged to cool the compressed gas. A moisture separator is positioned to receive the flow of compressed gas from the evaporator and separate the flow into a flow of dry compressed gas and a flow of condensate. A heat exchanger is positioned to receive the flow of compressed refrigerant and the flow of condensate and is arranged to cool the flow of refrigerant with the flow of condensate.

In yet another construction, the invention provides a gas compression system that includes a gas compressor operable to produce a flow of compressed gas, a refrigerant compressor operable to produce a flow of compressed refrigerant, and an evaporator positioned to receive the flow of compressed refrigerant and the flow of compressed gas and arranged to cool the compressed gas. A separator is positioned to receive the flow of compressed gas from the evaporator and separate the flow into a flow of dry compressed gas and a flow of condensate. A heat exchanger is positioned to receive the flow of compressed refrigerant and the flow of condensate and is arranged to cool the flow of refrigerant with the flow of condensate. A condenser is positioned to receive the flow of compressed refrigerant and is arranged to cool the flow of refrigerant with the flow of air. The heat exchanger and the condenser cooperate to cool the flow of compressed refrigerant to a desired temperature.

In still another construction, the invention provides a method of drying a flow of compressed gas. The method includes separating the flow of compressed gas into a second flow of compressed gas and a flow of condensate, compressing a refrigerant to produce a flow of compressed refrigerant, and directing the flow of condensate into a thermal exchange relationship with the flow of compressed refrigerant to cool the flow of compressed refrigerant. The method also includes directing the cool compressed refrigerant into a thermal exchange relationship with the flow of compressed gas to cool the flow of compressed gas and separate the second flow of compressed gas and the flow of condensate.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
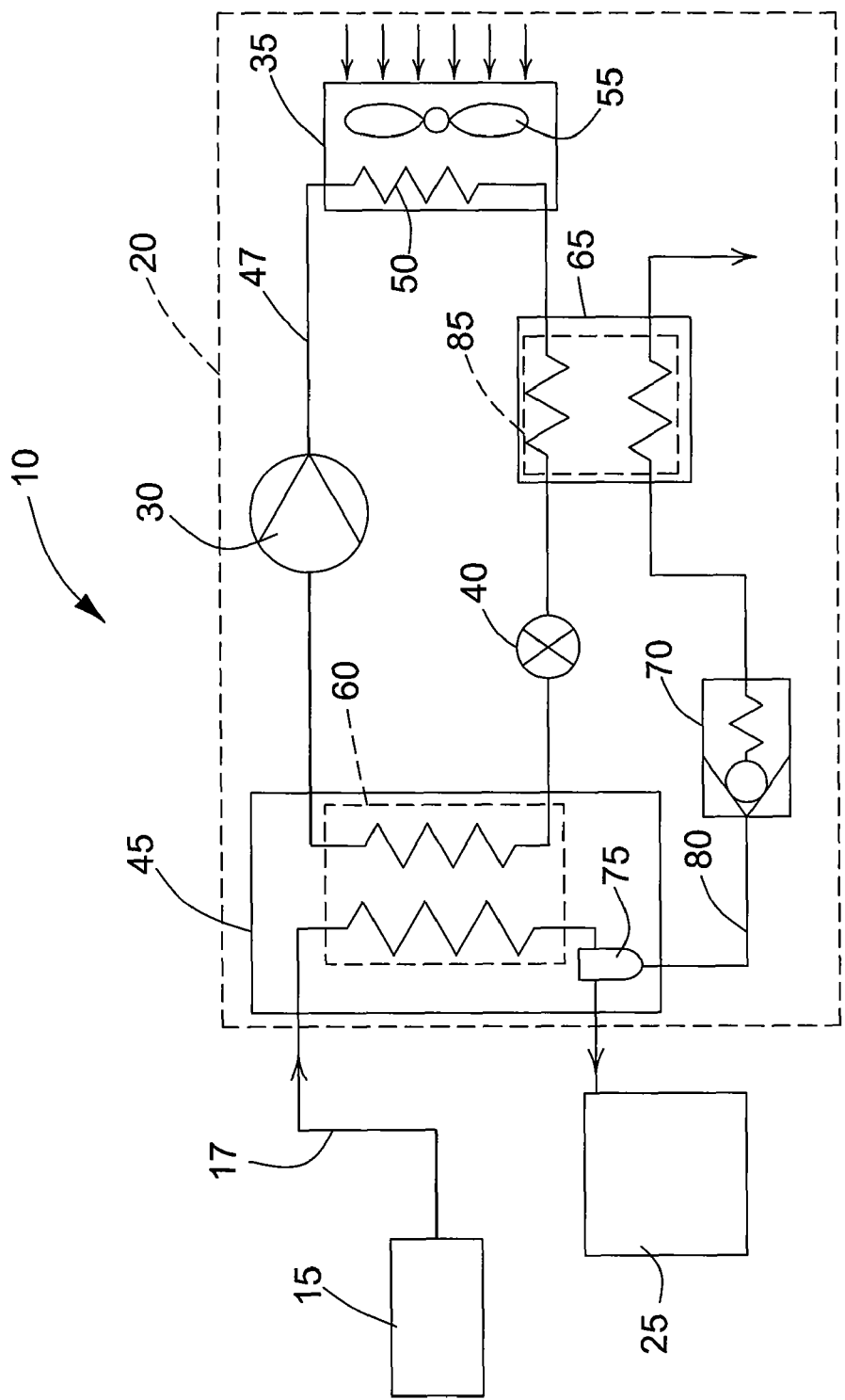
FIG. 1 is a schematic illustration of a gas compression system including a refrigerated dehumidification system.

FIG. 1 schematically illustrates one possible arrangement of a gas compression system 10 that includes a compressor 15 and a dryer system 20 that cooperate to provide dry compressed gas to a system or point of use 25. The system or point of use 25 may include one or more injection molding machines, pneumatic equipment, pneumatic tools, pneumatic actuators, pneumatic controls, and the like.

The compressor 15 may include a single compressor or a plurality of compressors arranged in parallel and/or series to output a flow of compressed gas 17 at a desired flow rate and pressure. In addition, the compressor 15 may include a rotary compressor such as a rotary screw compressor, a centrifugal compressor, a reciprocating compressor, or another compressor design or combinations thereof. Thus, the invention should not be limited by the type, quantity, or arrangement of the compressor 15 or compressors.

The dryer system 20 of FIG. 1 includes a refrigerant compressor 30, a condenser 35, an expansion device 40, and an evaporator 45 arranged in a manner similar to a standard refrigeration cycle. The refrigerant compressor 30 may include one or more compression devices that are suited to compressing a refrigerant to produce a flow of refrigerant 47. For example, one or more rotary screw compressor and/or one or more scroll compressors could be employed as the refrigerant compressor 30. Of course, other types of compressors or combinations of compressors not described herein could be employed as refrigerant compressors 30 if desired.

The condenser 35 includes a first heat exchanger 50 that cools the refrigerant to remove a portion of the heat of compression. In the illustrated arrangement, a microchannel heat exchanger 50 and a fan 55 are employed to cool the refrigerant. The fan 55 may be operated continuously, intermittently, or at variable speeds to achieve the desired level of cooling of the refrigerant. In preferred constructions, the refrigerant condenses within the condenser 35 such that a flow of liquid refrigerant exits the condenser 35. As one of ordinary skill in the art will realize, many other heat exchanger designs could be employed in the condenser 35. For example, finned-tube heat exchangers, shell and tube heat exchanges, plate-fin heat exchangers and the like could be employed within the condenser 35. Thus, the invention should not be limited to the type of heat exchanger employed.

The expansion device 40 is positioned downstream of the condenser 35 such that it receives a flow of high-pressure liquid refrigerant that has passed through the condenser 35. The expansion device 40 causes a rapid expansion of the refrigerant which produces a corresponding drop in the temperature of the refrigerant after it exits the expansion device 40.

The evaporator 45 includes a second heat exchanger 60 that transfers heat between the refrigerant after it exits the expansion device 40 and the flow of compressed gas that exits the compressor 15. Because both the refrigerant and the compressed gas are under pressure, a heat exchanger 60 that contains the two flows should be employed. Thus, a shell and tube, a plate-fin, a microchannel, or other heat exchanger arrangement is generally employed. As the refrigerant flows through the second heat exchanger 60 it is heated by the flow of compressed gas, which in turn cools. In preferred constructions, the refrigerant is heated to a temperature above its boiling point at the operating pressure to produce a superheated vapor. The superheated vapor exits the evaporator 45 and flows to the refrigerant compressor 30 to complete the refrigeration cycle.

As one of ordinary skill in the art will realize, other components or systems that are commonly employed in refrigeration systems could also be employed in the present arrangement. For example, a vessel could be positioned in the cycle to collect excess refrigerant and serve as a reservoir. Additionally, check valves, sensors, and controls could be positioned at various points along the refrigeration system if desired.

In addition to the refrigeration system, the dryer 20 of FIG. 1 also includes a recuperator 65, a check valve 70, and a moisture separator 75. The moisture separator 75 is positioned within, or downstream of the evaporator 45 and receives the flow of compressed gas after it has passed through a substantial portion of the second heat exchanger 60. As the compressed gas passes through the second heat exchanger 60 and cools, moisture condenses within the flow. The moisture separator 75 separates the moisture from the gas to dry the flow of compressed gas and produce a flow of condensate 80.

Many types of moisture separators 75 could be employed in the construction of FIG. 1. For example, coalescing filter type moisture separators could be employed to remove the condensed liquid from the compressed gas. Alternatively, flow induced separators or gravity induced separators that separate condensed moisture by relying on the weight or inertia of the large liquid droplets could also be employed as desired. As one of ordinary skill in the art will realize, many different moisture separators 75 or combinations of moisture separators 75 are possible. As such, the invention should not be limited to the few examples described herein.

As one of ordinary skill in the art will realize, typical moisture separators do not remove all of the moisture within the compressed gas. Rather, the separators remove a portion of the air to provide what is sometimes referred to herein as "dry air" or "dry gas". However, the compressed air or gas is not completely dry. To further improve the effective dryness of the air, some constructions may employ a heat exchanger that heats the compressed gas as it leaves the moisture separator. This heat exchanger separates the gas temperature from the dew point temperature to assure that no additional moisture condenses within the system.

The condensate 80 exits the evaporator 45 and flows to the check valve 70 positioned between the evaporator 45 and the recuperator 65. The check valve 70 is arranged to inhibit the flow of fluid from the recuperator 65 to the evaporator 45, while allowing the flow of condensate 80 from the evaporator 45 to the recuperator 65. In some constructions, the check valve 70 may be omitted.

The recuperator 65 includes a third heat exchanger 85 that is positioned to receive the refrigerant from the condenser 35 and deliver the refrigerant to the expansion device 40. The third heat exchanger 85 includes a second flow path that receives the flow of condensate 80 and discharges the flow of condensate 80 from the system 10. The condensate 80 is cooler than the refrigerant at this point in the refrigeration cycle. As such, the condensate 80 cools the refrigerant and is heated as it passes through the recuperator 65.

The third heat exchanger 85 may include two substantially closed and pressurized flow paths or may include one flow path (the second flow path) that is open or exposed to atmospheric pressure. Thus, many different types of heat exchanges could be employed as the third heat exchanger 85 (e.g., finned-tube, plate-fin, shell and tube, etc.). In preferred constructions, both flow paths in the third heat exchanger 85 are maintained at a pressure greater than atmospheric pressure, thus requiring two closed paths.

Figure 5:
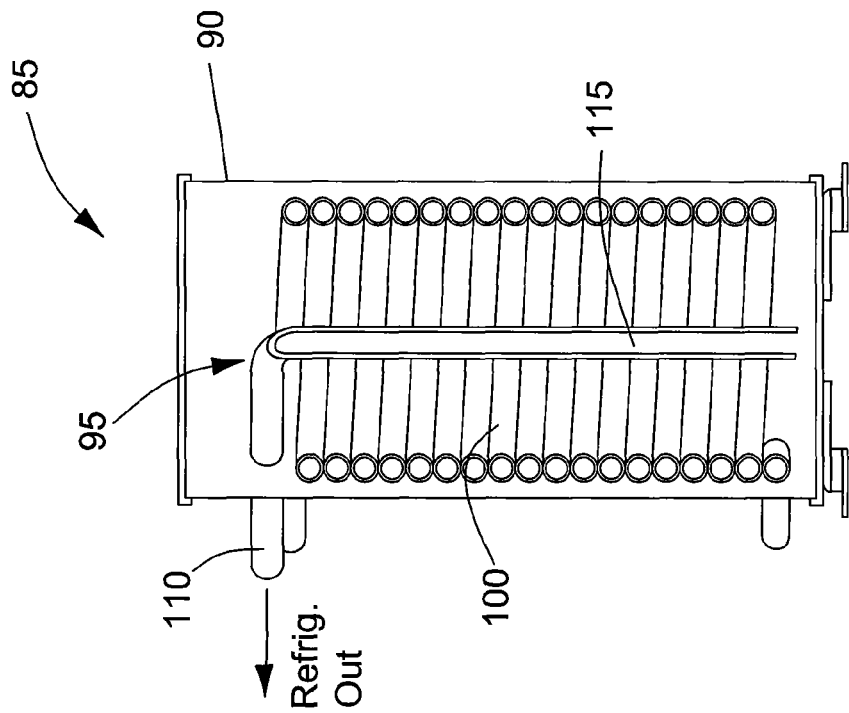
FIG. 5 is another section view of the heat exchanger of FIG. 1.
Figure 4:
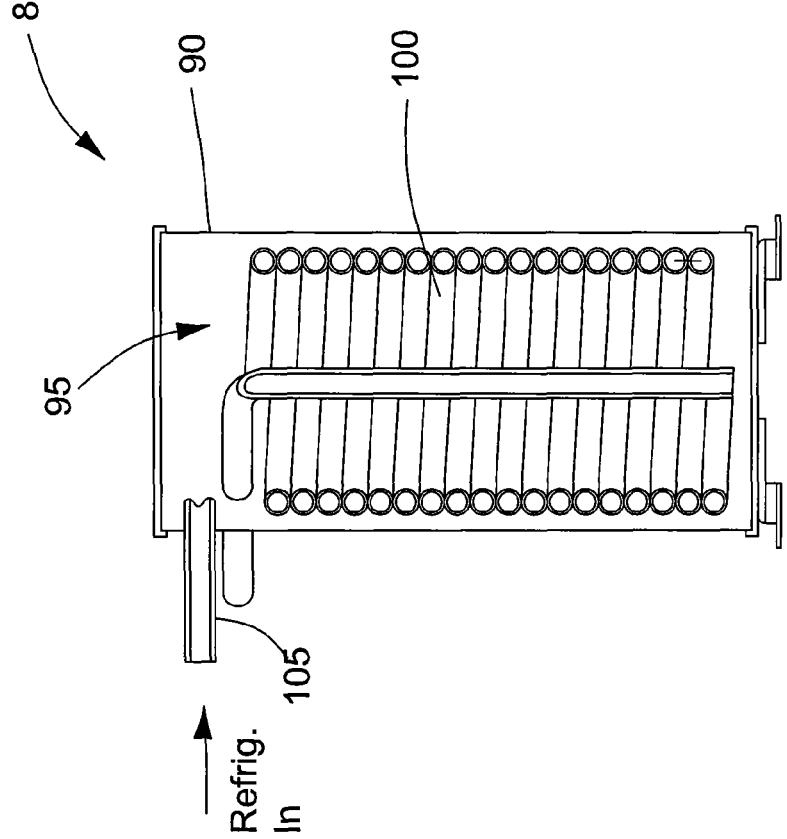
FIG. 4 is a section view of a heat exchanger of FIG. 1.
Figure 6:
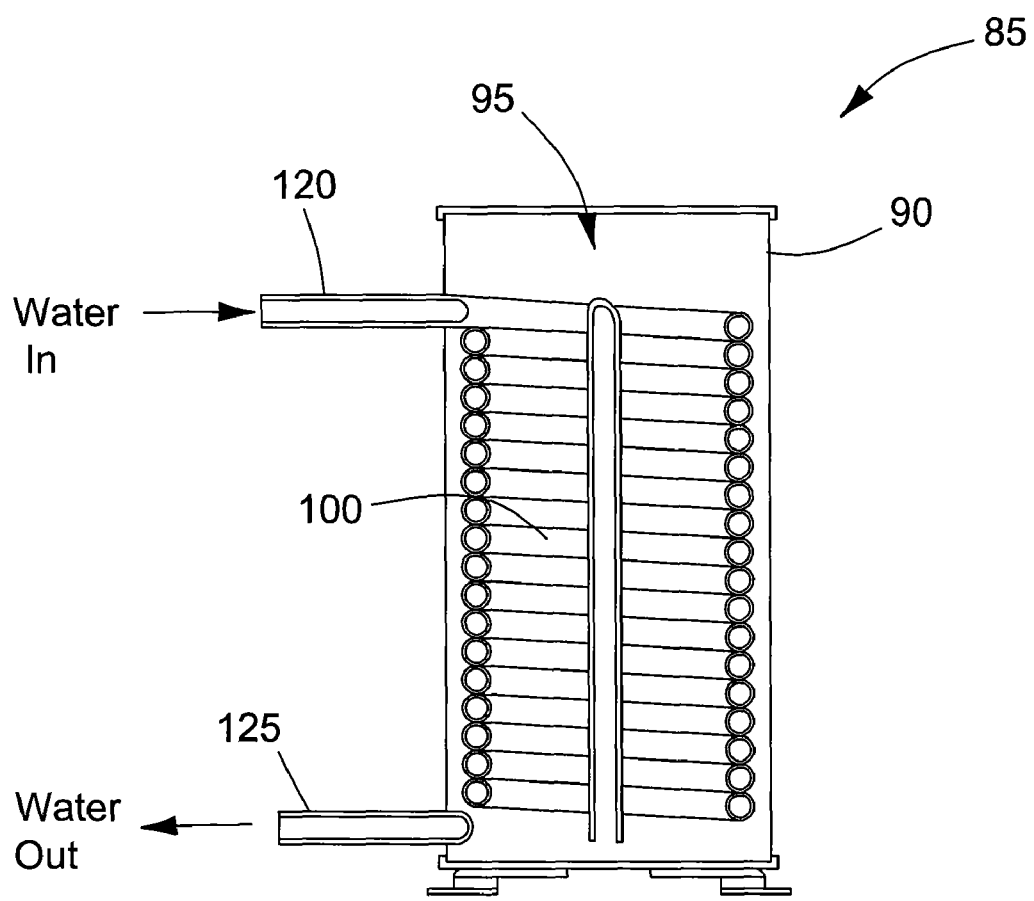
FIG. 6 is another section view of the heat exchanger of FIG. 1.

FIGS. 4-6 illustrate one possible arrangement of the third heat exchanger 85 that employs a shell and tube arrangement. A shell 90 defines a space 95 that encloses a tube 100. The shell 90 receives the flow of refrigerant 47. The refrigerant 47 enters near the top of the shell 90 via a refrigerant inlet 105 shown in FIG. 4. An outlet tube 110, shown in FIG. 5 is positioned near the top of the shell 90 and directs refrigerant out of the third heat exchanger 85. The tube 110 includes an extension 115 that extends to a point near the bottom of the shell 90 such that the refrigerant exiting the shell 90 is drawn from the lowermost point of the shell 90 and as such is the coolest refrigerant within the shell 90.

The shell 90 and the space 95 can be sized to provide a reservoir for refrigerant storage if desired. Refrigerant levels within the shell 90 would vary depending on the demand of the refrigeration system. In addition, when positioned downstream of the condenser 35, such as is illustrated in FIG. 1, the lower portion of the shell 90 will contain liquid refrigerant with a layer of refrigerant vapor disposed above. The layer of vapor provides hydraulic damping within the system that will reduce the hydraulic effects (e.g., pressure spikes) created by the movement (opening and closing) of valves within the refrigeration system.

As illustrated in FIG. 6, the condensate 80 (or water) enters the tube 100 at a condensate inlet 120 near the top of the shell 90 and flows downward through the shell 90 and out a condensate outlet 125. The arrangement illustrated in FIGS. 4-6 cools the refrigerant 47 using the excess cooling capacity of the condensate 80 that would otherwise be wasted.

In operation, the refrigerant compressor 30 operates to compress refrigerant vapor and direct that compressed refrigerant 47 to the condenser 35. The condenser 35 cools and condenses the refrigerant 47 and directs that refrigerant 47 to the recuperator 65 and from the recuperator 65 to the expansion device 40. The expansion device 40 expands and cools the refrigerant 47 before the refrigerant 47 flows to the evaporator 45. The refrigerant 47 flows through the evaporator 45 where it is heated and boils before flowing to the refrigerant compressor 30 to complete the refrigeration cycle.

Meanwhile, the compressor 15 operates to draw in atmospheric air, compress that air, and discharge the flow of compressed air 17. The compressed air 17 flows into the evaporator 45 and is cooled by the flow of refrigerant 47 through the evaporator 45. The flow of compressed air 17 also heats the flow of refrigerant 47 in the evaporator 45. As the compressed air 17 cools, moisture condenses in the compressed air stream and is separated from the compressed air 17 in the moisture separator 75. The condensate 80 is then directed from the moisture separator 75, and through the check valve to the recuperator 65 where it further cools the refrigerant 47 before the refrigerant enters the expansion device 40. Thus, the cool condensate 80 is used to reduce the temperature of the refrigerant 47, thereby reducing the amount of cooling required at the condenser 35. The reduced load on the condenser 35 improves the efficiency of the refrigeration system and thus improves the efficiency of the gas compression system 10. Alternatively, the condensate 80 cools the refrigerant 47 to a lower temperature than what would be possible without the recuperator 65, thereby allowing for additional cooling of the compressed air 17 and a lower dew point in the compressed air 17 after drying. The systems illustrated herein are also able to function using a smaller condenser 35 than what would be required without the recuperator 65. The smaller condenser can reduce the cost and the space requirements of the condenser 35.

Figure 2:
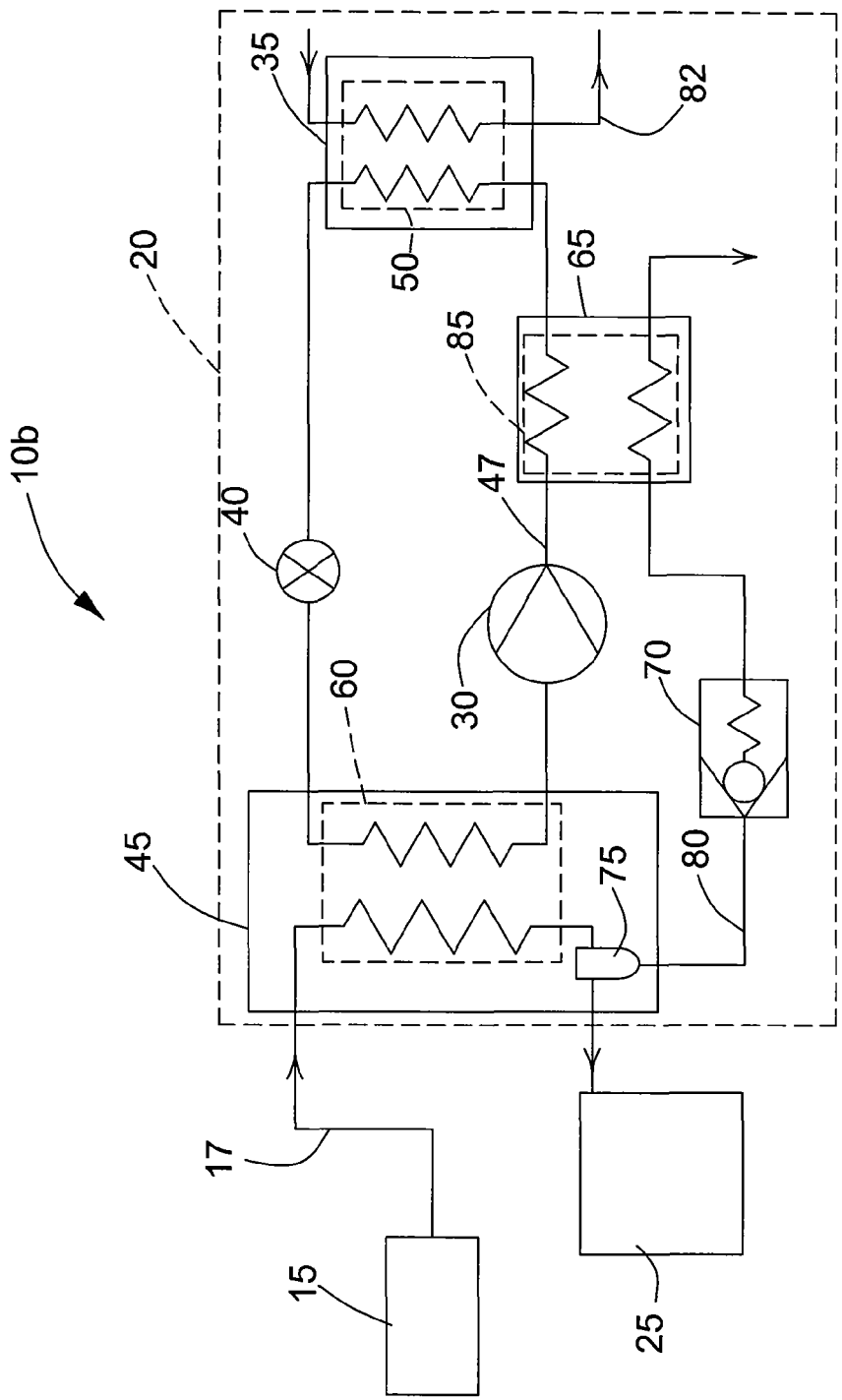
FIG. 2 is a schematic illustration of another gas compression system including another refrigerated dehumidification system.

FIG. 2 illustrates an alternative construction of the system of FIG. 1 in which the recuperator 65 is positioned upstream of the condenser 35 rather than downstream. In addition, the system 10b of FIG. 2 includes a flow of coolant 82 that replaces the fan 55 of the condenser 35. The remainder of the components are arranged substantially as described with regard to FIG. 1. In this position, the refrigerant 47 is hotter when it enters the third heat exchanger 85 and the condensate 80 pre-cools the refrigerant 47 before the refrigerant 47 enters the condenser 35. This arrangement still allows for the condenser 35 to cool the refrigerant 47 to a predetermined temperature using less energy, or allows the system to cool the refrigerant 47 to a lower temperature than could be achieved without the use of the recuperator 65. Thus, the system 10a of FIG. 2 can improve the efficiency of the gas compression system 10a and/or can reduce the dew point of the compressed gas 17 to a temperature that is lower than what could be achieved without the recuperator 65.

The arrangement of FIG. 2 is particularly suited to systems in which the condensate temperature is not low enough to efficiently cool the refrigerant 47 after it exits the condenser 35, but is cool enough to provide some pre-cooling of the refrigerant 47 before it enters the condenser 35.

Figure 3:
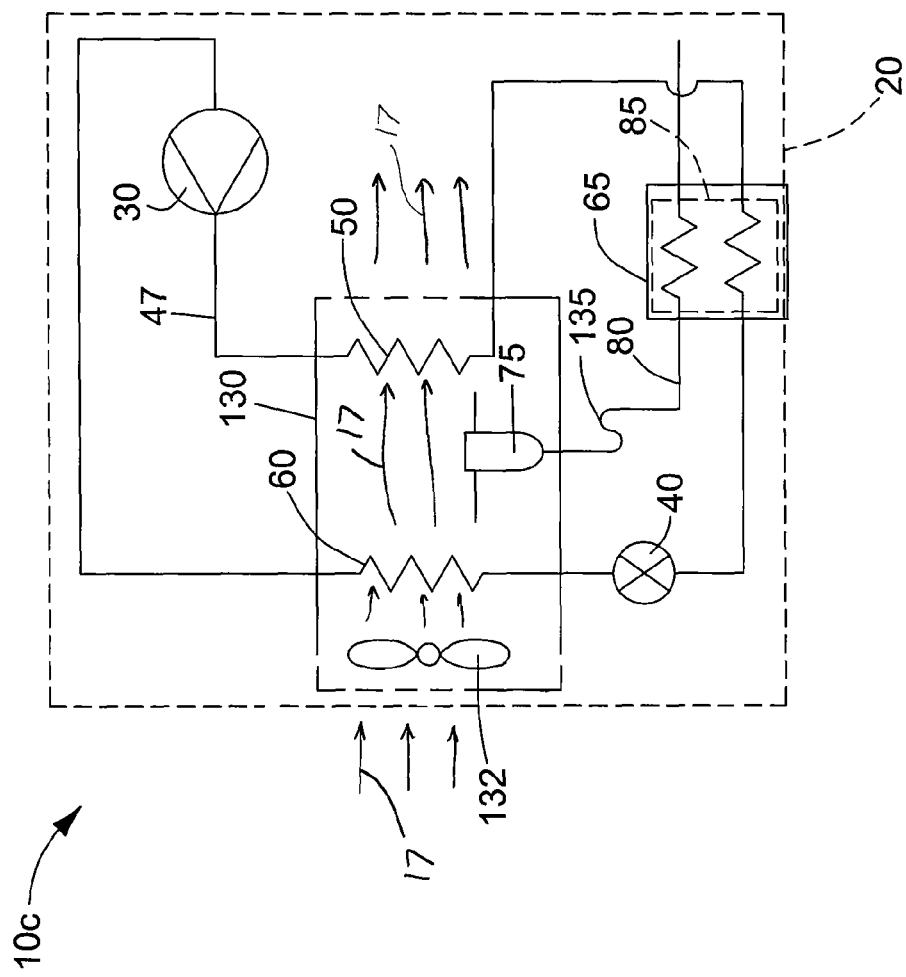
FIG. 3 is a schematic illustration of another air drying system including another refrigerated dehumidification system.

FIG. 3 illustrates another air drying system 10c in which a recuperator 65 is used to improve the efficiency of a refrigerated air dryer. Unlike the systems of FIGS. 1 and 2, the system of FIG. 3 is used to dry a flow of essentially ambient pressure air 17 rather than compressed air. This system could be employed to dry air in a refrigerator or for a building such as a home, office building, or factory. In the construction of FIG. 3, the first heat exchanger 50 and the second heat exchanger 60 are positioned within a common housing 130. In this arrangement, the refrigeration cycle operates in much the same way as has been described with regard to FIG. 1.

However, in the construction of FIG. 3 there is no compressor or point of use. Rather, there is a fan 132 that draws ambient air into the housing 130 and through the second heat exchanger 60 where the air 17 is cooled. The reduced temperature causes some of the moisture within the air 17 to condense out and collect in the bottom of the housing 130. The now cooler air 17 is then directed to the first heat exchanger 50 where the air 17 cools the refrigerant. The air is then discharged from the housing and used as desired. The condensate 80 flows out of the housing 130 and through the recuperator 65 to further cool the refrigerant 47 after it leaves the first heat exchanger 50. Of course, the recuperator 65 could be positioned upstream of the first heat exchanger 50 rather than downstream if desired.

FIG. 3 also illustrates an alternative to the use of a check valve 70. In the arrangement of FIG. 3, a drain trap arrangement 135 is employed to reduce the likelihood of reverse flow of condensate 80.

The construction of FIG. 3 is advantageous in that the air exiting the system 10c is heated slightly after being dried. The heating assures that the air temperature is well above the dew point of the air, thereby reducing the likelihood of additional moisture condensing from the flow of air during use.

One of ordinary skill will realize that there are other arrangements and orientations for the systems and components described herein. As such, the invention should not be limited to the few examples described herein.

It should be noted that while the illustrated constructions have been described as being employed with an air compression system, other gasses could be compressed and dried using the illustrated constructions. As such, the invention should not be limited to air compression systems alone.

Thus, the invention provides, among other things, a gas compression system 10 that includes a drying system 20 that uses condensate 80 to improve the efficiency of the gas compression system 10.

What is claimed is:

1. A gas compression system comprising:
   a first flow of compressed gas;
   a separator positioned to receive the first flow of compressed gas at a pressure greater than atmospheric pressure and operable at that pressure to separate the first flow of compressed gas into a second flow of compressed gas and a flow of condensate at a pressure greater than atmospheric pressure;
a flow of compressed refrigerant; and
a heat exchanger positioned to receive the flow of condensate and the flow of compressed refrigerant, the heat exchanger arranged such that the flow of condensate cools the flow of refrigerant.

2. The gas compression system of claim 1, further comprising a condenser positioned to receive the flow of compressed refrigerant, the condenser and the heat exchanger cooperating to cool the flow of refrigerant to a desired temperature.

3. The gas compression system of claim 2, further comprising an evaporator positioned to receive the flow of compressed refrigerant and the first flow of compressed gas, the evaporator arranged to facilitate cooling of the first flow of compressed gas.

4. The gas compression system of claim 2, wherein the condenser discharges the flow of compressed refrigerant to the heat exchanger.

5. The gas compression system of claim 1, further comprising a check valve disposed between the separator and the heat exchanger to inhibit the flow of condensate from the heat exchanger to the separator.

6. A gas compression system comprising:
a gas compressor operable to produce a flow of compressed gas;
a refrigerant compressor operable to produce a flow of compressed refrigerant;
an evaporator positioned to receive the flow of compressed refrigerant and the flow of compressed gas and arranged to cool the compressed gas;
a moisture separator positioned to receive the flow of compressed gas from the evaporator and separate the flow into a flow of dry compressed gas and a flow of condensate at a pressure greater than atmospheric pressure; and
a heat exchanger positioned to receive the flow of compressed refrigerant and the flow of condensate at a pressure greater than atmospheric pressure and arranged to cool the flow of refrigerant with the flow of condensate.

7. The gas compression system of claim 6, further comprising a condenser positioned to receive the flow of compressed refrigerant, the condenser and the heat exchanger cooperating to cool the flow of refrigerant to a desired temperature.

8. The gas compression system of claim 7, wherein the condenser discharges the flow of compressed refrigerant to the heat exchanger.

9. The gas compression system of claim 6, further comprising a check valve disposed between the moisture separator and the heat exchanger to inhibit the flow of condensate from the heat exchanger to the moisture separator.

10. A gas compression system comprising:
a gas compressor operable to produce a flow of compressed gas;
a refrigerant compressor operable to produce a flow of compressed refrigerant;
an evaporator positioned to receive the flow of compressed refrigerant and the flow of compressed gas and arranged to cool the compressed gas;
a separator positioned to receive the flow of compressed gas from the evaporator and separate the flow into a flow of dry compressed gas and a flow of condensate at a pressure greater than atmospheric pressure;
a heat exchanger positioned to receive the flow of compressed refrigerant and the flow of condensate at a pressure greater than atmospheric pressure and arranged to cool the flow of refrigerant with the flow of condensate; and
a condenser positioned to receive the flow of compressed refrigerant and arranged to cool the flow of refrigerant, the heat exchanger and the condenser cooperating to cool the flow of compressed refrigerant to a desired temperature.

11. The gas compression system of claim 10, wherein the condenser discharges the flow of compressed refrigerant to the heat exchanger.

12. The gas compression system of claim 10, further comprising a check valve disposed between the separator and the heat exchanger to inhibit the flow of condensate from the heat exchanger to the separator.

13. A method of drying a flow of compressed gas, the method comprising:
separating the flow of compressed gas at a pressure greater than atmospheric pressure into a flow of dry compressed gas and a flow of condensate;
compressing a refrigerant to produce a flow of compressed refrigerant;
directing the flow of condensate at a pressure greater than atmospheric pressure into a thermal exchange relationship with the flow of compressed refrigerant to cool the flow of compressed refrigerant; and
directing the cool compressed refrigerant into a thermal exchange relationship with the flow of compressed gas to cool the flow of compressed gas and separate the second flow of compressed gas and the flow of condensate.

14. The method of claim 13, further comprising directing the flow of compressed refrigerant to a condenser to partially cool the flow of compressed refrigerant.

15. The method of claim 13, further comprising directing the flow of refrigerant from the condenser to a recuperator, the recuperator providing the thermal exchange relationship between the flow of condensate and the flow of compressed refrigerant.

* * * * *